Nov. 27, 1951          S. RAMO          2,576,696
GENERATION OF ELECTROMAGNETIC WAVES BY DOPPLER EFFECTS
Filed March 15, 1945          2 SHEETS—SHEET 1
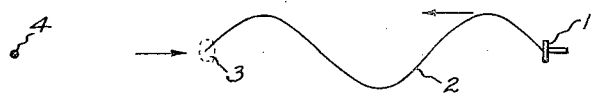
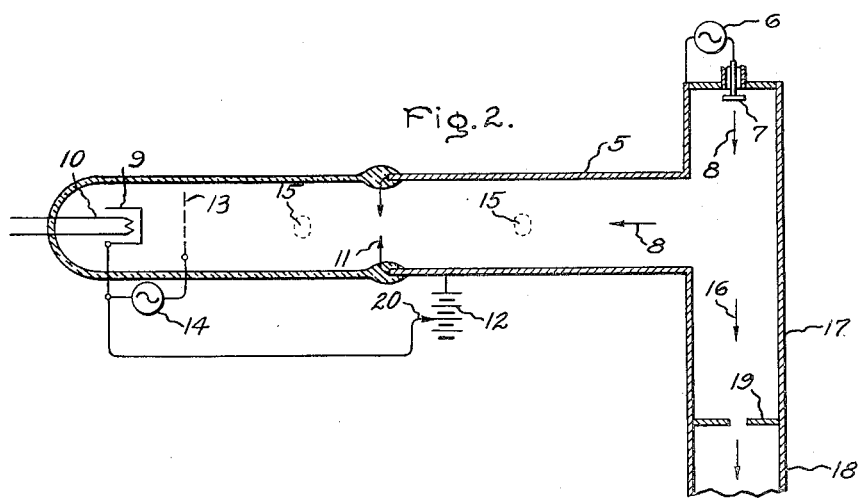
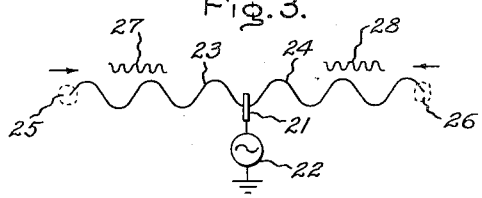
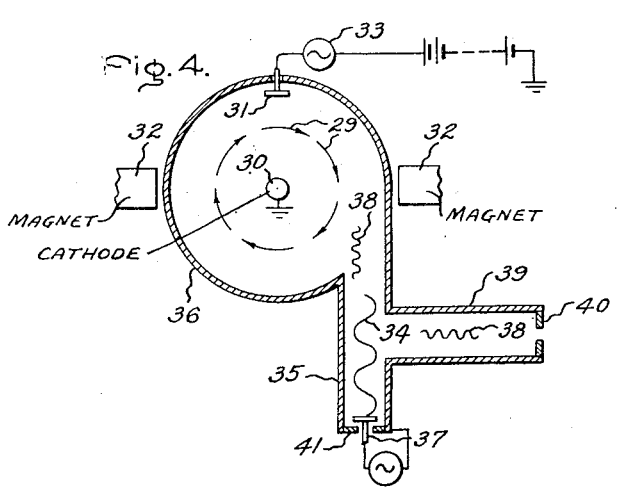
Inventor:
Simon Ramo,
by Harry E. Dunham
His Attorney.

Nov. 27, 1951     S. RAMO     2,576,696
GENERATION OF ELECTROMAGNETIC WAVES BY DOPPLER EFFECTS
Filed March 15, 1945     2 SHEETS—SHEET 2
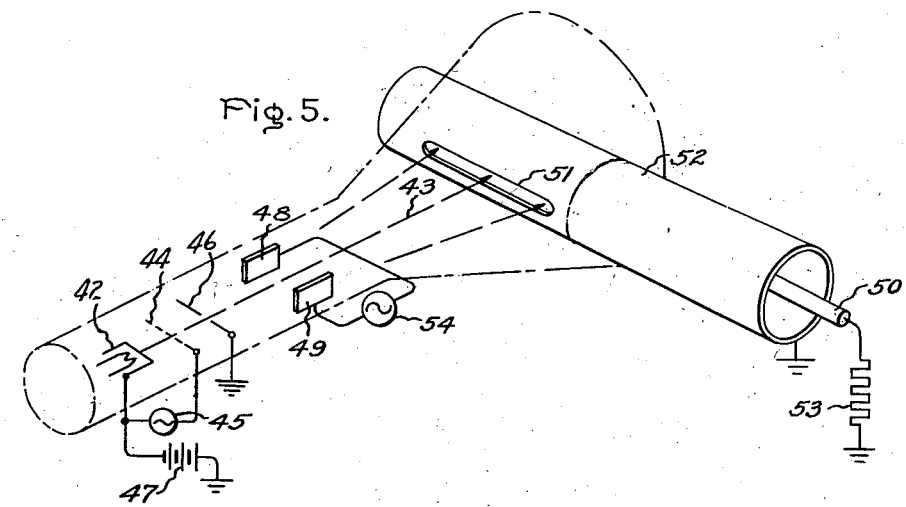
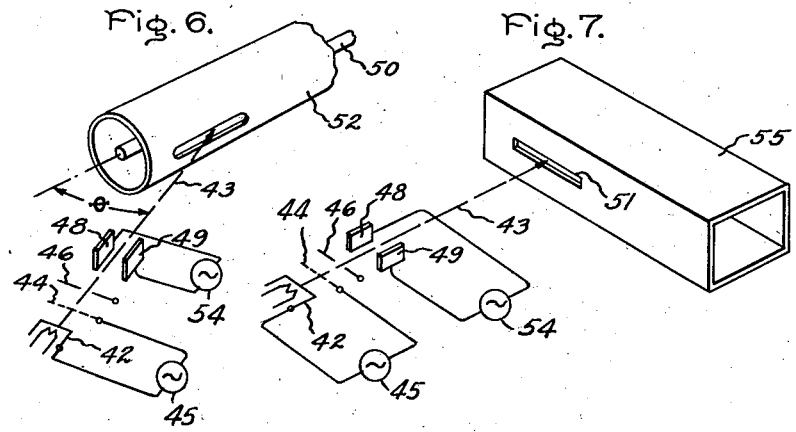
Inventor:
Simon Ramo,
by *Harry E. Dunham*
His Attorney.

Patented Nov. 27, 1951

2,576,696

UNITED STATES PATENT OFFICE 2,576,696

GENERATION OF ELECTROMAGNETIC WAVES BY DOPPLER EFFECTS

Simon Ramo, Schenectady, N. Y., assignor to General Electric Company, a corporation of New York Application March 15, 1945, Serial No. 582,916

25 Claims. (Cl. 250—36)

My present invention relates to the generation of electric waves and is concerned primarily with new and improved methods and means for generating waves of electric energy by the utilization of Doppler effects.

It is known that a source of waves moving with respect to an observer appears to that observer to have a frequency different from the emission frequency of this source by an amount dependent upon the velocity of the source relative to the observer. The frequency appears to be greater or less than the true value according to whether the distance between the source and observer is being diminished or lengthened. This is true for waves transmitted through a stationary medium and applies to electromagnetic waves, as well as sound and light waves. It is an object of my invention to utilize this principle for the generation of electromagnetic waves having extremely short wave lengths.

It is another object of my invention to provide new and improved means for converting electromagnetic waves of a given wave length to waves of a different wave length, either shorter or longer.

It is a still further object of my invention to provide new and improved methods and means for producing electromagnetic waves having a length of the order of one millimeter.

It is a further object of my invention to provide new and improved methods and means for producing extremely short waves at a minimum power loss.

It is a still further object of my invention to provide a new and improved system for producing frequency modulated high frequency waves.

It is a still further object of my invention to provide a new and improved system for producing frequency modulated high frequency waves which permits accurate control of the center frequency of the output waves.

It is a still further object of my invention to provide a new and improved method and means for producing frequency modulation of waves from sources of ultra high frequency waves which do not in themselves readily permit shifting of frequency.

It is a still further object of my invention to provide new and improved means and method for producing frequency modulated converted waves.

In its broad aspect, my invention consists in reflecting electromagnetic waves of a given frequency from a moving electric charge to produce another electromagnetic wave of a different frequency, the difference in frequency between the two waves being a function of the relative velocities of the moving charge and the incident electromagnetic wave. In another of its aspects, the invention contemplates production of extremely short waves by obtaining multiple reflections between moving charges and electromagnetic waves. In still another of its aspects, the invention consists in moving a modulated charge relative to a stationary wave transmitting system to produce an effect upon the output of the system which is a function of the movement of the charge.

For a better understanding of my invention, reference may be had to the following description taken in connection with the accompanying drawings and its scope will be pointed out in the appended claims. Fig. 1 of the drawings illustrates basically the interaction of moving charges and electromagnetic waves to produce other electromagnetic waves by Doppler effects; Fig. 2 illustrates schematically an ultra high frequency generator employing the principles of the basic illustration of Fig. 1; Fig. 3 shows a modification of the invention as applied to the source of moving charges; Fig. 4 illustrates apparatus for producing electromagnetic waves by the interaction of a rotating space charge and an electromagnetic wave; Fig. 5 illustrates a frequency modulation system employing the principles of my invention; Fig. 6 shows a modification of the system of Fig. 5; and Fig. 7 illustrates a frequency modulation system employing dielectric wave guides.

In Fig. 1 there is shown a stationary source 1 which may be for example a probe or other type of electrode for producing an electromagnetic wave 2, the wave 2 being indicated as moving to the left in this figure. The numeral 3 represents a high speed electric charge moving in a direction opposite to that of the electromagnetic wave 2. I have discovered that the interaction of the electromagnetic waves 2 of a stationary source with a high speed charge 3 may be utilized to produce a Doppler effect for generating an additional electromagnetic wave. For maximum utilization of the theoretical possibilities of the effect, relatively high speed electrons may be used. The formula for describing the Doppler effects without making any approximations is as follows:

$$f' = \frac{1+\beta}{\sqrt{1-\beta^2}} f \qquad (1)$$

where $f$ and $f'$ are the frequencies observed by one moving with the source of waves and one who has a relative velocity with respect to the source, respectively.

$$\beta = \frac{v}{c}$$

where $v$ is the relative velocity of the two observers and $c$ is the velocity of light. The charge 3 may be for example a group of electrons, that is a region holding electric charge which is moving toward the source 1 with the velocity $v$, the source 1 being at rest and emitting an electromagnetic wave having a frequency as measured by a stationary observer as $f_0$. The frequency $f_e$ which the electrons of the charge 3 see is $$f_e = \frac{1+\beta}{\sqrt{1-\beta^2}} f_0 \qquad (2)$$

Accordingly, the electrons of the charge 3 are caused to vibrate around their average position because of the electromagnetic forces of the incident waves 2, the frequency of such a vibration having the value $f_e$. In so vibrating, the electrons send out electromagnetic waves, these waves being a dispersion or reflection of the original impinging waves from the source 1, of course. To an imaginary observer, however, who moves with the charge 3, the waves appear as being emitted with a frequency $f_e$.

To an observer at the point 1, the waves emitted from the charge 3 appear as waves received from a moving source, the frequency of the received reflected waves being, $$f_r = \frac{1+\beta}{\sqrt{1-\beta^2}} f_e \qquad (3)$$

When Equation 2 is combined with Equation 3, the resultant value of the reflected wave is $$f_r = \frac{1+\beta}{1-\beta} f_0 \qquad (4)$$

This is the value of the frequency of the reflected waves observed at the point 1. It is apparent that to another stationary observer, at the point 4 for example, who is behind the group of moving electrons 3, the sign of $\beta$ is reversed and this observer will receive waves dispersed from the source 1 at the original frequency $f_0$, as well as waves generated by the vibrating electrons 3 due to the interaction between the electromagnetic waves 2 and the electrons 3. These newly generated waves have a frequency $f_{r'}$ which is less than the frequency of waves from the source 1. Since, by the utilization of sufficiently high voltages in producing the high speed moving charge 3, it is possible to accelerate the electron charge to values at which $\beta$ is close to unity, it is possible to obtain values of $f_r$ which are substantially greater than $f_0$. For example, if a wave emitted by the source 1 has a wave length of the order of one centimeter, by the use of a voltage of approximately 300,000 volts one obtains high speed electrons having a value of $\beta$ of approximately .8 and through the interaction of such high speed electrons with the one centimeter wave, a one millimeter wave is dispersed from the electron.

Fig. 2 illustrates diagrammatically apparatus for producing extremely short waves in the manner explained above. A dielectric wave guide 5 formed by suitable conductive enclosing walls is supplied with electromagnetic waves having a frequency $f_0$ from a source 6 through any suitable coupling means, such as a probe 7, the waves being indicated by the arrows 8. A beam of electrons is emitted from an electron gun 9, the gun having the usual heating element 10, and is directed into the wave guide 5 through an iris or filter 11 used for reflecting the electromagnetic waves 8 to prevent their transmission through the open end of the wave guide 5. The wave guide 5 functions likewise as the anode of a tube of which the gun 9 forms the cathode, accelerating potentials for electrons emitted from the gun 9 being supplied by a source of voltage, such as the battery 12. The electrons may be caused to enter the wave guide 5 as pulses of charge by the operation of a grid 13 and a high frequency modulating voltage 14. The most desirable frequency for the modulating voltage 14 from the point of view of efficiency of the electromagnetic wave generating system is a function of the dimensions and geometry of the wave guide, as well as the current density of the pulses of charge 15 and the accelerating voltage. It is apparent that, when many pulses exist in the wave guide at one time, a greater reflection of energy of the waves from the movable source 7 is obtained. It is important, however, that the wave guide 5 is not completely filled with a uniform space charge to prevent the medium within the guide from acting simply as a stationary medium of different dielectric constant. To this end, preferably the modulating voltage 14 is of a frequency high enough to insure variations in the electron beam before it travels the length of the guide. Stated in other words, the length of the guide 5 should be comparable with the length of the wave of the modulating source 14 if electrons having a velocity near the velocity of light are used.

As explained previously, because of the interaction of the electromagnetic forces of the impinging waves 8 on the electrons which form the pulse of high speed electric charge 15, these electrons are caused to vibrate around their average position and disperse an electromagnetic wave having a frequency $f_r$ indicated by Equation 4. Such waves are indicated by the arrow 16. The generated waves 16 of very short wave length may be permitted to pass through the branch wave guide 17 to an output guide 18 through the action of any suitable filter 19 tuned to the frequency of waves 16, the function of the filter 19 being to reflect the electromagnetic waves 8 while permitting passage of the higher frequency electromagnetic waves 16.

Means are also provided for frequency modulating the newly generated waves 16 and comprise means, such as the movable potentiometer arm 20, for varying the accelerating potential applied to the pulses of charge which pass through the grid 13. One of the important advantages of generating electromagnetic waves of very short wave length by use of apparatus of the type illustrated in Fig. 2 is that, in reflecting energy from the incident waves 8 off the moving charges 15 to produce the new waves 16, there is substantially no transfer of thermal or shot noise or any other undesirable noises from the moving charges to the generated waves. That such undesirable transfer of noise is substantially not made may be readily understood from the fact that the newly generated waves are due entirely to the vibrations of the electrons of the charge, each of which acts as a generator of the high frequency waves.

In the usual electron tube, the electron stream effects a transfer of energy directly by changing the unidirectional currents to high frequency currents. In such a tube, the cathode emits electrons at random so that the unidirectional current has a high frequency component due to the thermal emission. Such high frequency components due to the emitter are indistinguishable from high frequency components due to the high frequency signals impressed upon the electron stream. Both components are supplied to an output impedance so that the desired signals, as well as undesired noise components, are reproduced across the impedance. In contrast, in my system for generating high frequency waves, rather than convert a unidirectional current into a high frequency wave, the electromagnetic wave 8 is reflected off of the moving charge 15 to produce a new or converted electromagnetic wave. Consequently, the high frequency effects of the electronic beam are not reproduced across an impedance to be transmitted to an output circuit. Any shot noises or high frequency components in the moving charges, in themselves, cannot change into a wave which is reflected. As a result, the resultant output noise is entirely different from that in the usual electronic tube and obviously much reduced in value since the electronic beam or moving charges 15 work into the relatively low output impedance of the wave guide 5.

Another important feature of the system described is that because the electromagnetic waves 8 in passing through the wave guide 5 are either converted into waves of higher frequency when they impinge upon the moving charges 15 or are reflected off the relatively good conducting material constituting the iris or filter 11, very high efficiencies of operation may be obtained, the length of wave guide 5 in itself being a relatively high Q circuit, that is, a circuit whose ratio of stored energy to dissipated energy is large. The energy of the wave guide 5 is either converted into new waves by reflection of the moving charges or reflected from the iris 11 and stored in the high Q circuit, an extremely small amount of energy being dissipated in the enclosing structure.

In the schematic illustration of Fig. 3, there is shown a modification of the principle outlined in the discussion of Fig. 1. In this modification, a stationary source, such as the probe 21, excited by the high frequency generator 22, emits electromagnetic waves 23, 24 of a given frequency. Two moving charge pulses 25, 26 of different velocity characteristics approaching the source 21 act as reflectors for the waves 23, 24 to produce waves of higher frequency. The reflected waves of higher frequency 27, 28, in turn, impinge upon the moving charge pulses, or other charges of a beam of which the charges 25, 26 form a part, to produce other reflected waves having a still higher frequency. By such multiple reflection of waves between moving charges, waves of extremely high frequencies and very short wave lengths may be produced even though the pulses of moving charges 25, 26 have only moderate velocities.

Fig. 4 illustrates another modification of my invention in which electrons in a rotating space charge are used to create the moving reflector for incident electromagnetic waves. The rotating space charge 29 may be established, for example, within a magnetron tube having a centrally located cathode 30, an anode 31, and a magnetic system 32 for producing rotation of the electrons emitted by the cathode 30. The electrons preferably are produced in pulses by the action of a source of modulating voltage 33 applied between the anode 31 and the cathode 30. An input electromagnetic wave 34 is introduced into a wave guide section 35 connected to the magnetron tank 36 by any suitable input probe 37. When the wave 34 impinges upon the high speed electrons 29 rotating in a direction opposite to the direction of motion of the wave 34, this wave is reflected to produce an electromagnetic wave 38 of higher frequency and shorter wave length. The wave 38 may be supplied to any suitable utilization means through a branch wave guide 39, filtering means 40 being utilized to permit passage of the wave 38 and reflection of the wave 34. In the same manner, the filter 41 at the end of the wave guide 35 may be used to reflect a shorter wave length 38 to prevent leakage of energy of this frequency at the end of the wave guide 35. It is understood of course that the filters 40, 41 are so placed with respect to the remaining portions of the wave guide structure that multiple reflections of both waves 34 and 38 within the wave guide system are prevented.

One of the advantages of the system of Fig. 4 is that relatively high efficiencies of operation may be obtained, since the electron beam 29 is maintained in rotation and a minimum number of electrons are collected by the anode 31. In the ideal case of course no unidirectional currents are collected in the anode 31. An alternative form of the principle of the system of Fig. 4 may be utilized in an electronic tube of the Barkhausen-Kurz type in which multiple oscillation of electrons is obtained with a consequent reduction of the unidirectional current required for operation of the system.

In Fig. 5 there is shown a modification of my invention in which a beam of modulated electrons is used to generate frequency modulated electromagnetic waves by varying the region of influence of the beam with respect to a stationary wave transmitting system. In the apparatus of this figure an electron gun 42 projects an electron beam 43 which is density modulated by means of a control grid 44 and a source of modulating potential 45 connected between the grid 44 and gun 42. Accelerating potentials for the beam 43 are applied between the anode 46 and the gun 42 by means of a source of voltage, such as the battery 47. The electron beam 43 passes between a pair of deflecting plates 48, 49 to impinge upon the inner conductor 50 of a coaxial transmission line located with its axis more or less transverse to the electron beam 43. To reach the inner conductor, the electron beam 43 passes through an axial slit 51 in the outer conductor 52. When the grid 44 is modulated at a radio frequency rate by the source 45, density modulations appear in the electron beam and a radio frequency current is in turn introduced between the inner and outer conductors of the transmission line at the point where the beam 43 impinges upon the line.

In the absence of deflecting potentials across the deflecting plates 48, 49, constant frequency radio frequency currents are transmitted through the generating system by way of the electron beam to the transmission line and travel down the line to a load represented conventionally as a resistance 53 having a value equal to the characteristic resistance of the coaxial line 50, 52, thus properly terminating this line. To frequency modulate the outgoing radio frequency power transmitted to the load 53, it is necessary only to give velocity to the beam 43 along the transmission line by the application to the deflecting plates of a suitable voltage obtained from the modulating source 54. Motion of the point of origin of the electromagnetic waves on the line results in a shift in received frequency at the load 53, i. e., by the action of the deflecting voltages on the electron beam, this beam is deflected from its mid position to impinge upon the inner conductor at points varying in position between the ends of the slot 51. In order that such motion of the point of origin may shift the frequency of the wave which is received at the load 53, the velocity with which the beam 43 must move along the slot 51 must bear approximately the same relation to the velocity of light C that the shift in frequency bears to the carrier frequency, i. e., the frequency of the source 45.

Because the beam 43, in moving along the slot 51, must eventually reach the end of the portion of the transmission line available through this slot, it is obvious that a continuous shift in frequency is not obtainable with the apparatus of Fig. 5. However, the apparatus is particularly suitable for applications where it is necessary to maintain a continuous shift only for a relatively short period of time. One such application is the type of communication system in which constant amplitude constant duration pulses are generated at a constant rate and in which the radio frequency of the pulses is to be shifted in accordance with signal intelligence. It has been found that for a carrier frequency of 3000 megacycles, a maximum shift of one megacycle and a pulse duration of one microsecond, the electron beam must traverse the transmission line 50, 52 at the rate of $\frac{1}{3000}$ of the velocity of light, viz., 100,000 meters per second. During a single pulse, therefore, the beam moves a total distance of 10 centimeters and has sufficient time between pulses to return to its original position.

Fig. 6 shows a modification of the apparatus of Fig. 5 in which a maximum compactness of form is realized by mounting the transmission line 50, 52 so that its axis makes only a small angle θ with the electron beam 43. It is apparent that with such a design a relatively small deflection of the beam causes a large motion at the point of intersection of the beam with the transmission line, giving a larger amount of frequency modulation for a given deflection voltage applied to the plates 48, 49.

Fig. 7 shows an additional modification of the frequency modulation system of Fig. 5 adapted for the generation of very high frequency electromagnetic waves. In this application, the beam 43 emitted from the electron gun 42, after passing through the deflecting plates 48, 49, impinges upon a longitudinal slot 51 in a dielectric wave guide 55 illustrated as of the rectangular hollow-pipe type. It is apparent that in general in the systems of Figs. 5-7 it is necessary to terminate both ends of the coaxial transmission line or the wave guides, as the case may be, in an impedance of such value that no reflection of waves result. It is apparent too that these systems are enclosed in an evacuated structure, not shown.

An important advantage of the frequency modulation systems of Figs. 5-7 is that no harmonics and no beat frequencies are found in the frequency modulation signals which are transmitted to the output circuits of the system.

Another important advantage of the systems of Figs. 1-4 is that when used as converters for superheterodyne receivers, for example, the systems give lower signal-to-noise ratios than obtained by systems heretofore known. This result follows from the fact that since energy is reflected off of moving charge, there is essentially no transfer of thermal noise from the electron stream to the newly generated wave.

Among the important uses of the system illustrated are to obtain minute differences in frequency, such as are required in frequency analyzers, as well as to obtain scanning frequencies for use in such analyzers. The principles of the systems of Figs. 1-4 may be employed likewise for investigation of all types of gaseous discharges, such as a lightning discharge, the impingement of an electromagnetic wave upon the discharge being effective to produce a new electromagnetic wave of different frequency.

While I have shown and described my invention as applied to particular systems embodying various devices diagrammatically shown, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. A system for producing a frequency modulated electromagnetic wave comprising a wave guide, means for establishing an electromagnetic wave of a first frequency within said wave guide, means for impinging within said wave guide a beam of high velocity electric charges varying in intensity along the direction of said beam at a second frequency rate upon said wave to produce reflected electromagnetic waves of a different frequency in accordance with the relative velocity of said charges and said first wave, and means for varying the velocity of said charges to frequency modulate said last electromagnetic wave.

2. A high frequency generator comprising a dielectric wave guide, means for establishing an electromagnetic wave within said guide, means for impinging within said wave guide high velocity electrons varying in intensity at a predetermined rate upon said wave to produce a reflected electromagnetic wave having a frequency differing from that of said first wave and said predetermined rate.

3. A high frequency generator comprising a dielectric wave guide, means for establishing an electromagnetic wave within said guide, means for impinging within said guide high velocity electrons varying in intensity at a predetermined rate upon said wave to produce a reflected electromagnetic wave having a frequency differing from that of said first wave and said predetermined rate, and means for varying the velocity of said electrons to frequency modulate said reflected wave.

4. A generator of frequency modulated waves comprising a coaxial transmission line; and a source for exciting said line including means for impinging a beam of density modulated electrons upon said line at a point thereon to produce currents on said line varying at a rate corresponding to the modulation of said beam, and means for varying the position of said point upon said line to vary the instantaneous frequency of said currents.

5. An ultra high frequency system comprising a coaxial transmission line having inner and outer conductors, said outer conductor having a longitudinal slit providing access to said inner conductor; and a source for exciting said line including means for impinging a beam of electrons through said slit upon a point of said inner conductor, means for density modulating said electrons to produce an electromagnetic wave on said line varying in frequency in accordance with said modulations, and means for varying the position of said point to frequency modulate said wave.

6. An ultra high frequency system comprising a coaxial transmission line having an inner conductor and an outer conductor, said outer conductor having a longitudinal slit providing access to said inner conductor; and a source for exciting said line including means for impinging a beam of electrons through said slit upon a point of said inner conductor, means for varying the density of said beam to produce an electromagnetic wave on said line, and means for deflecting said beam to vary the position of said point and the instantaneous frequency of said wave.

7. An ultra high frequency generator comprising a dielectric wave guide having a longitudinal slot therein; and a source for exciting said guide including means for projecting a beam of density modulated electrons through said slot into said guide to establish an electromagnetic wave therein, and means to vary the position of said beam along said slot to vary the instantaneous frequency of said wave.

8. An electromagnetic wave generator comprising a closed container having a high ratio of stored energy to dissipated energy, means for producing a moving electric charge within said container, means for impinging electromagnetic waves of a first frequency upon said charge to form by reflection therefrom electromagnetic waves of a frequency different therefrom in accordance with the relative velocity of said charge and said first waves, and filter means within said container for reflecting waves of said first frequency whereby waves of said first frequency are retained in said container.

9. A generator of electromagnetic waves comprising: electromagnetic wave transmitting means capable of being excited to propagate electromagnetic waves; and a source for so exciting said means including a source of energy capable of causing electromagnetic waves in said means and moving with respect thereto, said source of energy being variably distributed, the energy of said energy source varying periodically at a predetermined frequency, and control means for moving said source of energy with respect to said first mentioned means whereby controlled electromagnetic waves of frequency substantially different from said predetermined frequency may be propagated in said first mentioned means.

10. A generator of electromagnetic waves comprising: electromagnetic wave transmitting means capable of being excited to propagate electromagnetic waves; and a source for so exciting said means including a source of energy comprising a beam of successively grouped electrical particles capable of causing electromagnetic waves in said means and moving with respect thereto, means for varying the energy of said energy source periodically at a predetermined frequency, and control means for moving said source of energy with respect to said first mentioned means whereby controlled electromagnetic waves of frequency substantially different from said predetermined frequency may be propagated in said first mentioned means.

11. A generator of electromagnetic waves comprising: electromagnetic wave transmitting means capable of being excited to propagate electromagnetic waves; and a source for so exciting said means including a source of energy comprising a beam of successively grouped electrical particles so energized as to be capable of causing electromagnetic waves in said means and moving with respect thereto, means for varying the energy of said energy source periodically at a predetermined frequency, and control means for moving said source of energy with respect to said first mentioned means whereby controlled electromagnetic waves of frequency substantially different from said predetermined frequency may be propagated in said first mentioned means.

12. A generator of electromagnetic waves comprising: electromagnetic wave translating means capable of being excited to propagate electromagnetic waves; and a source for so exciting said means including means for producing a source of variably disposed energy capable of inducing electromagnetic oscillations in said first mentioned means and moving with respect thereto, means for causing the energy of said energy source to vary periodically at a predetermined frequency, and control means for moving said source of energy with respect to said first mentioned means whereby controlled electromagnetic waves of frequency substantially different from said predetermined frequency may be induced in said first mentioned means.

13. A generator of electromagnetic waves comprising means capable of being excited to propagate electromagnetic waves; and a source for so exciting said means including means for producing a source of energy comprising a beam of successively grouped electrical particles capable of inducing electromagnetic waves in said first mentioned means and moving with respect thereto, means for causing the energy of said energy source to vary periodically at a predetermined frequency, and control means for moving said source of energy with respect to said first mentioned means whereby controlled electromagnetic waves of frequency substantially different from said predetermined frequency may be induced in said first mentioned means.

14. The method of generating high frequency electromagnetic waves by means of high velocity charged particles and a source of electromagnetic waves comprising the steps of producing a nonuniform density of high velocity electric charges within a volume, projecting electromagnetic waves in a direction opposite to the direction of velocity of said high velocity charged particles to excite said charged particles, and directly collecting the waves of substantially higher frequency obtained by Doppler effects from said moving charged particles.

15. The method of producing electromagnetic energy of very high frequency by means of high velocity electrons and a source of substantially lower frequency electromagnetic energy comprising the steps of forming a beam of high velocity electrons of non-uniform density, transmitting electromagnetic energy in a direction opposite to the direction of motion of said electrons to excite said electrons and obtain from them reflections of energy of a substantially higher frequency, and directly collecting said reflected energy from said electrons.

16. The method of producing electromagnetic energy of very high frequency by means of high velocity electrons and a source of substantially lower frequency electromagnetic energy comprising the steps of forming a first beam of high velocity electrons of non-uniform density, transmitting electromagnetic energy in a direction opposite to the direction of motion of said electrons to excite said electrons and obtain from them reflections of energy of a substantially higher frequency, directing said reflections of electromagnetic energy against a second beam of high velocity electrons of non-uniform density, and collecting the energy reflected from said second beam of electrons.

17. A wave generator comprising a wave guide having an opening therein; and a source for exciting said wave guide including electrode means producing an electric charge of non-uniform density, said electric charge moving with respect to said wave guide, said electrode means and said wave guide being so oriented that said electric charge passes through said opening into said wave guide to develop electromagnetic waves therein, a second electrode means adapted to move said electric charge in the direction of propagation of the electromagnetic waves within said guide and thereby developing electromagnetic energy of very high frequency by Doppler effects.

18. A wave generator comprising an electromagnetic wave transmitting means having a slot therein; and a source of electromagnetic waves for exciting said means including electrode means producing electric charges density modulated and moving with respect to said transmission line, said electrode means and said transmission line being oriented so that said electric charges pass through said slot into said transmission line, a second electrode means adapted to move said density modulated electric charges along said slot to develop electromagnetic waves within said transmission line of a frequency different from the frequency of electromagnetic waves that would be developed by the density modulation alone.

19. A wave generator comprising a transmission line having a slot therein; and a source of energy for exciting said line including electrode means adapted to produce a beam of density modulated electrons passing through said slot, said electrode means being oriented with respect to said transmission line to effect an angular entry of said beam into said slot, and a second electrode means for deflecting said beam laterally whereby said density modulated electrons develop electromagnetic energy of very high frequency in said transmission line by Doppler effects.

20. Apparatus as in claim 9 in which said first mentioned means comprises a coaxial transmission line and said energy source comprises a beam of electrons whereby currents on said line varying at said predetermined frequency will be generated and their instantaneous frequency varied when said beam is moved by said control means.

21. Apparatus as in claim 10 in which said electromagnetic wave transmitting means is a coaxial transmission line, said beam being directed to impinge upon a point along said line.

22. Apparatus as in claim 10 in which said electromagnetic wave transmittting means comprises a coaxial transmission line having inner and outer conductors, said outer conductor having a longitudinal slit providing access to said inner conductor, said beam being directed through said slit upon a point of said inner conductor, and said control means being operable to move said beam along said slit.

23. Apparatus as in claim 10 in which said wave transmittting means comprises a coaxial transmission line having inner and outer conductors, said outer conductor having a longitudinal slit providing access to said inner conductor, said beam being directed through said slit upon a point of said inner conductor, and said control means being operable to move said beam along said slit, the electromagnetic waves propagated in said wave transmitting means being frequency modulated.

24. Apparatus as in claim 10 in which said wave transmitting means comprises a dielectric wave guide having a longitudinal slot therein, said beam being directed to project through said slot.

25. Apparatus as in claim 10 in which said wave transmitting means comprises a closed container having a high ratio of stored energy to dissipated energy, said source for exciting said transmitting means including means for impinging electromagnetic waves of a first frequency upon said particles whereby said controlled electromagnetic waves will be formed by reflection from said particles, said closed container having filter means to retain said first frequency waves within said container.

SIMON RAMO.

REFERENCES CITED

The following references are of record in the file of this patent:

UNITED STATES PATENTS

| Number | Name | Date |
|--------|------|------|
| 1,777,378 | Potter | Oct. 7, 1930 |
| 2,272,165 | Varian et al. | Feb. 3, 1942 |
| 2,275,480 | Varian | Mar. 10, 1942 |
| 2,338,237 | Fremlin | Jan. 4, 1944 |
| 2,357,313 | Carter | Sept. 5, 1944 |
| 2,380,981 | McElhannon | Aug. 7, 1945 |
| 2,391,914 | McElhannon | Jan. 1, 1946 |
| 2,409,991 | Strobel | Oct. 22, 1946 |